United States Patent
Sato et al.

(10) Patent No.: US 11,656,819 B2
(45) Date of Patent: May 23, 2023

(54) INFORMATION PROCESSING APPARATUS AND PRINTING REQUEST FOR DESIGNATING DOCUMENTS BASED ON A SPOKEN VOICE

(71) Applicant: FUJIFILM Business Innovation Corp., Tokyo (JP)

(72) Inventors: Koichi Sato, Kanagawa (JP); Kiyoshi Yasukawa, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/521,818

(22) Filed: Nov. 8, 2021

(65) Prior Publication Data

US 2022/0405032 A1    Dec. 22, 2022

(30) Foreign Application Priority Data

Jun. 18, 2021   (JP) .............................. JP2021-101511

(51) Int. Cl.
*G06F 3/12*   (2006.01)
*G06F 3/16*   (2006.01)

(52) U.S. Cl.
CPC .......... *G06F 3/1253* (2013.01); *G06F 3/1204* (2013.01); *G06F 3/1288* (2013.01); *G06F 3/167* (2013.01)

(58) Field of Classification Search
CPC .... G06F 3/1253; G06F 3/1204; G06F 3/1288; G06F 3/167

USPC .......................................................... 358/1.2
See application file for complete search history.

(56) References Cited

U.S. PATENT DOCUMENTS

| | | | | |
|---|---|---|---|---|
| 11,195,530 | B1* | 12/2021 | Mannar | G06F 40/174 |
| 2008/0030770 | A1* | 2/2008 | Nishioka | G06F 3/1288 |
| | | | | 358/1.15 |
| 2012/0240045 | A1* | 9/2012 | Bradley | G09B 21/006 |
| | | | | 715/716 |
| 2014/0118773 | A1* | 5/2014 | Mochizuki | G06F 3/1205 |
| | | | | 358/1.14 |
| 2019/0278564 | A1* | 9/2019 | Matsuo | G10L 15/26 |
| 2019/0318724 | A1* | 10/2019 | Chao | G10L 15/22 |
| 2020/0280646 | A1* | 9/2020 | Onishi | G06F 3/1257 |
| 2020/0310722 | A1* | 10/2020 | Chan | G06F 3/1285 |
| 2021/0082419 | A1* | 3/2021 | Tran | G06F 40/30 |

FOREIGN PATENT DOCUMENTS

| | | |
|---|---|---|
| JP | 2002113919 | 4/2002 |
| JP | 2019096295 | 6/2019 |

* cited by examiner

*Primary Examiner* — Allen H Nguyen
(74) *Attorney, Agent, or Firm* — JCIPRNET

(57) ABSTRACT

An information processing apparatus includes a processor configured to receive a printing request for a document that is based on a spoken voice of a user and includes a designation of a specific element among plural elements constituting the document, and perform a control for printing a part including the specific element of the document.

16 Claims, 10 Drawing Sheets

INFORMATION PROCESSING APPARATUS AND PRINTING REQUEST FOR DESIGNATING DOCUMENTS BASED ON A SPOKEN VOICE

CROSS-REFERENCE TO RELATED APPLICATIONS

This application is based on and claims priority under 35 USC 119 from Japanese Patent Application No. 2021-101511 filed Jun. 18, 2021.

BACKGROUND

(i) Technical Field

The present invention relates to an information processing apparatus and a non-transitory computer readable medium storing a program.

(ii) Related Art

JP2019-96295A discloses a voice control system that displays a screen related to setting of an output apparatus on a display apparatus in a case where a voice instruction received by a voice control device is an instruction related to the setting of the output apparatus.

SUMMARY

In a case of making a printing request for a document by a spoken voice, a user cannot know, in advance, which part of the document includes which element. Accordingly, the user cannot designate a part including a specific element of the document and thus, cannot print the specific element of the document.

Aspects of non-limiting embodiments of the present disclosure relate to an information processing apparatus and a non-transitory computer readable medium storing a program that enable a specific element of a document to be printed even in a case where a user makes a printing request for the document by a spoken voice.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured to receive a printing request for a document that is based on a spoken voice of a user and includes a designation of a specific element among a plurality of elements constituting the document, and perform a control for printing a part including the specific element of the document.

BRIEF DESCRIPTION OF THE DRAWINGS

Exemplary embodiment(s) of the present invention will be described in detail based on the following figures, wherein.

DETAILED DESCRIPTION

Hereinafter, an exemplary embodiment of the present invention will be described in detail with reference to the accompanying drawings.

Outline of Present Exemplary Embodiment

The present exemplary embodiment provides an information processing apparatus that receives a printing request for a document which is based on a spoken voice of a user and includes a designation of a specific element among a plurality of elements constituting the document, and performs a control for printing a part including the specific element of the document.

In addition, the present exemplary embodiment provides an information processing apparatus that receives a printing request for a document based on a spoken voice of a user, performs a control for outputting a response voice indicating a part including each element of a plurality of elements constituting the document among a plurality of parts of the document, receives a designation of a specific part among the plurality of parts based on the spoken voice of the user, and performs a control for printing the specific part of the document.

Here, the document refers to a digitized document and includes, for example, documents created by document creation software, documents acquired by a scanner function, and documents transmitted and received by a FAX function. The element may be in any units obtained by dividing the document from a content-wise viewpoint. Hereinafter, a chapter, a section, a paragraph, and the like will be illustratively described as the element. The part may be in any units obtained by dividing the document from a format-wise viewpoint. Hereinafter, a page will be illustratively described as the part.

In addition, in a printing system including a smart speaker that collects voice of the user, and a printing apparatus that performs printing based on an instruction from the smart speaker, the information processing apparatus may be the smart speaker or the printing apparatus. A server that performs relaying between the smart speaker and the printing apparatus is provided below, and the information processing apparatus will be illustratively described as the server.

Overall Configuration of Printing System

Figure 1:
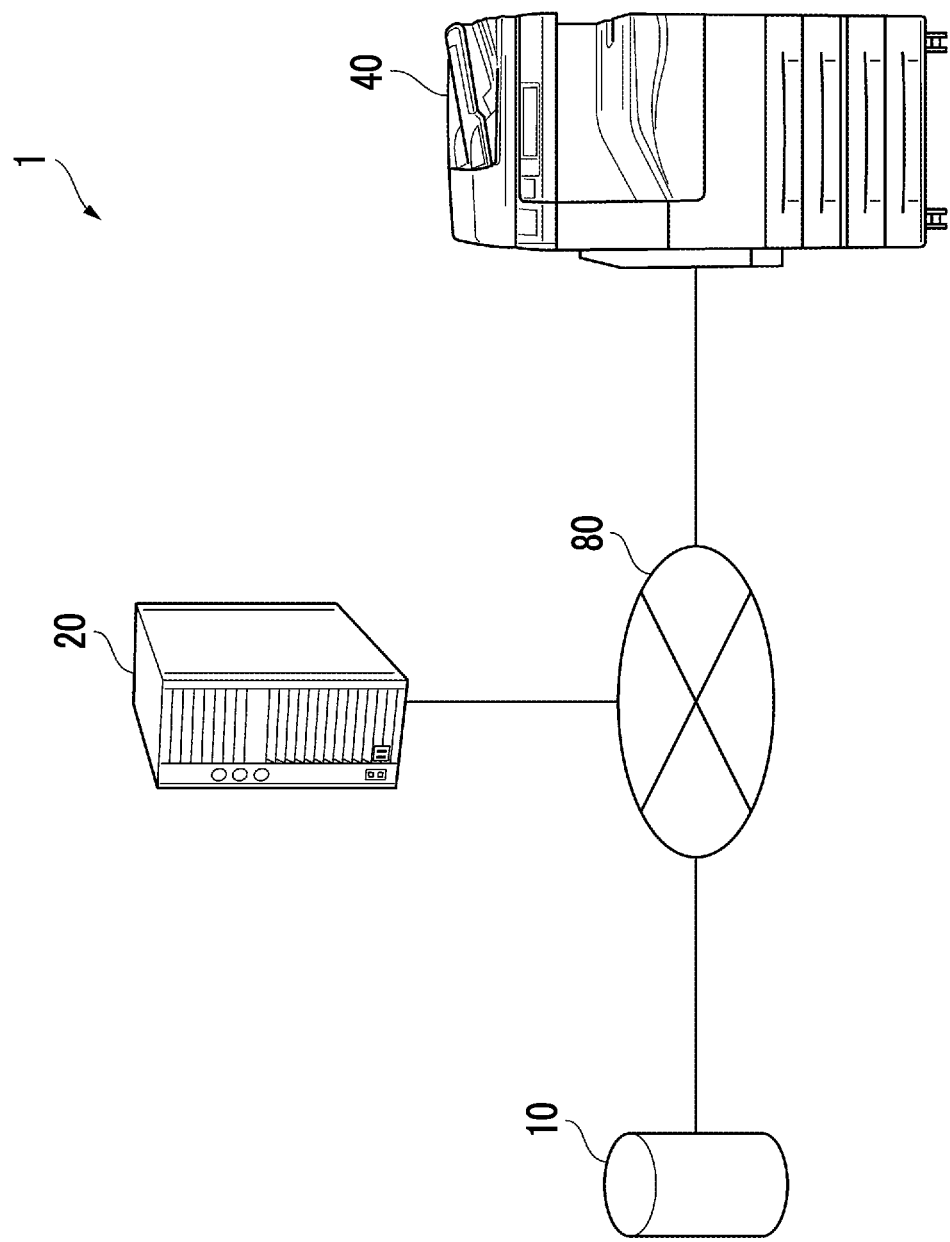
FIG. 1 is a diagram illustrating an overall configuration example of a printing system in an exemplary embodiment of the present invention.

FIG. 1 is a diagram illustrating an overall configuration example of a printing system 1 in the present exemplary embodiment. As illustrated, the printing system 1 is configured by connecting a smart speaker 10, a server 20, and a printing apparatus 40 to a communication line 80. While only one smart speaker 10, one server 20, and one printing apparatus 40 are illustrated in the drawing, two or more of each apparatus may be provided.

The smart speaker 10 is a speaker that has a voice assistant function and can obtain various information and respond via the communication line 80 in response to a query based on voice from the user, or control operations of various apparatuses. The smart speaker 10 is referred to as an AI speaker. Particularly, in the present exemplary embodiment, in a case where the user makes the printing request by voice, the smart speaker 10 recognizes the voice of the printing request, generates request information for requesting printing based on a result of recognition, and transmits the request information to the server 20.

The server 20 performs various processes based on information transmitted from the smart speaker 10. Particularly, in the present exemplary embodiment, the server 20 receives the request information for requesting printing from the smart speaker 10 and transmits a printing instruction based on the request information to the printing apparatus 40. In the present exemplary embodiment, the server 20 is provided as an example of the information processing apparatus.

The printing apparatus 40 prints an image on a recording medium such as paper. Particularly, in the present exemplary embodiment, the printing apparatus 40 prints the image on the recording medium based on the printing instruction transmitted from the server 20.

The communication line 80 is a line used for information communication between the smart speaker 10 and the server 20 and between the server 20 and the printing apparatus 40. For example, the Internet may be used as the communication line 80.

Hardware Configuration of Smart Speaker

Figure 2:
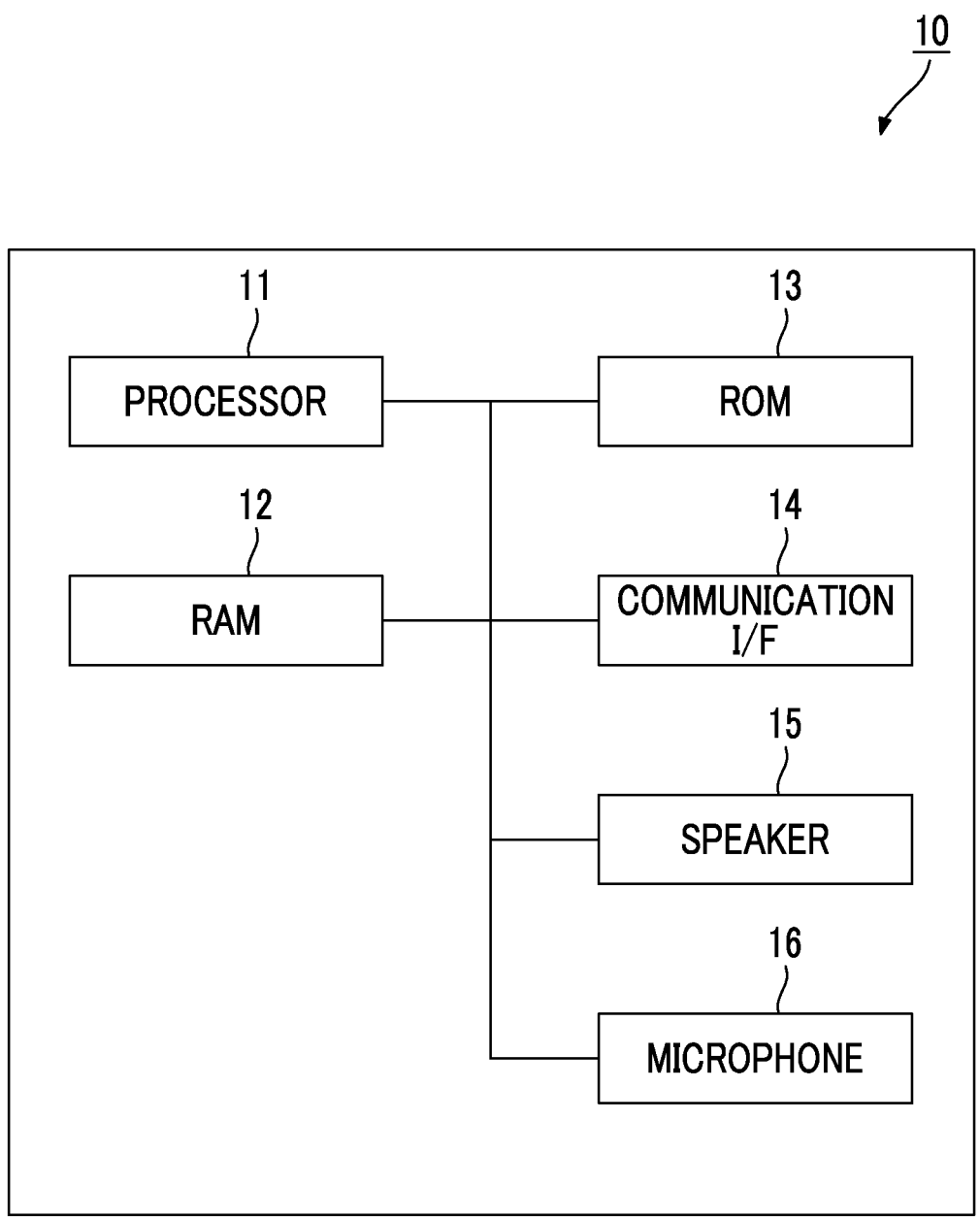
FIG. 2 is a diagram illustrating a hardware configuration example of a smart speaker in the exemplary embodiment of the present invention.

FIG. 2 is a diagram illustrating a hardware configuration example of the smart speaker 10 in the present exemplary embodiment. As illustrated, the smart speaker 10 includes a processor 11, a random access memory (RAM) 12, a read only memory (ROM) 13, a communication interface (hereinafter, referred to as a "communication I/F") 14, a speaker 15, and a microphone 16.

The processor 11 implements a process for input and output of voice by loading various programs stored in the ROM 13 or the like into the RAM 12 and executing the various programs. Such a process includes, for example, a process of generating voice data for outputting voice by the speaker 15 and a process of recognizing the voice of the printing request collected by the microphone 16 and converting the voice of the printing request into the request information.

The RAM 12 is a memory used as a work memory or the like of the processor 11. The ROM 13 is a memory storing the various programs or the like executed by the processor 11.

The communication I/F 14 transmits and receives various information to and from the server 20 via the communication line 80.

The speaker 15 outputs voice based on the voice data generated by the processor 11 to an outside. The microphone 16 collects voice emitted outside.

Hardware Configuration of Server

Figure 3:
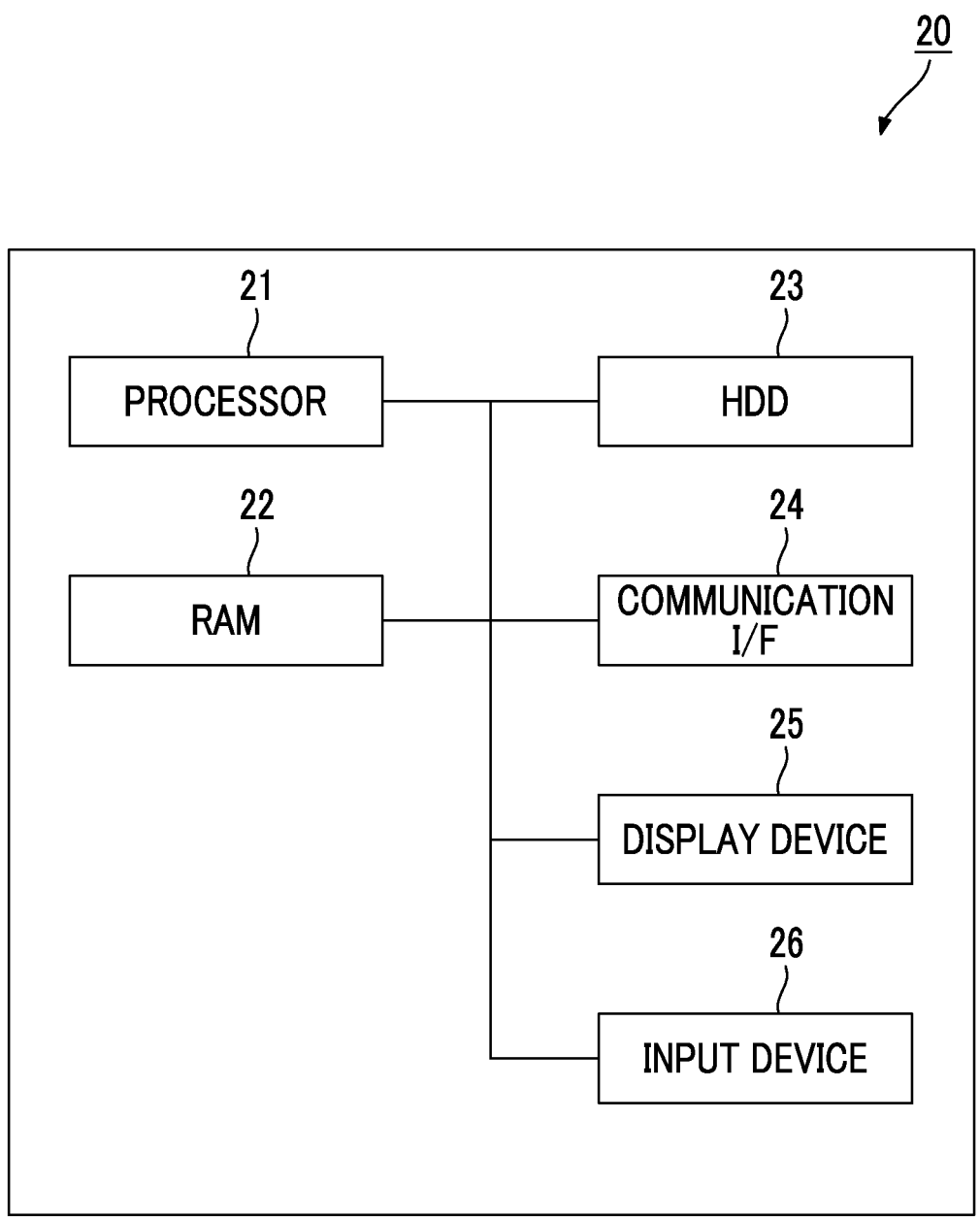
FIG. 3 is a diagram illustrating a hardware configuration example of a server in the exemplary embodiment of the present invention.

FIG. 3 is a diagram illustrating a hardware configuration example of the server 20 in the present exemplary embodiment. As illustrated, the server 20 includes a processor 21, a RAM 22, a hard disk drive (HDD) 23, a communication I/F 24, a display device 25, and an input device 26.

The processor 21 implements each function described later by executing various software such as an operating system (OS) and applications.

The RAM 22 is a memory used as a work memory or the like of the processor 21. The HDD 23 is, for example, a magnetic disk apparatus storing input data for various software, output data from various software, and the like.

The communication I/F 24 transmits and receives various information to and from the smart speaker 10 or the printing apparatus 40 via the communication line 80.

The display device 25 is, for example, a display that displays various information. The input device 26 is, for example, a keyboard or a mouse used for inputting information by the user.

Hardware Configuration of Printing Apparatus

Figure 4:
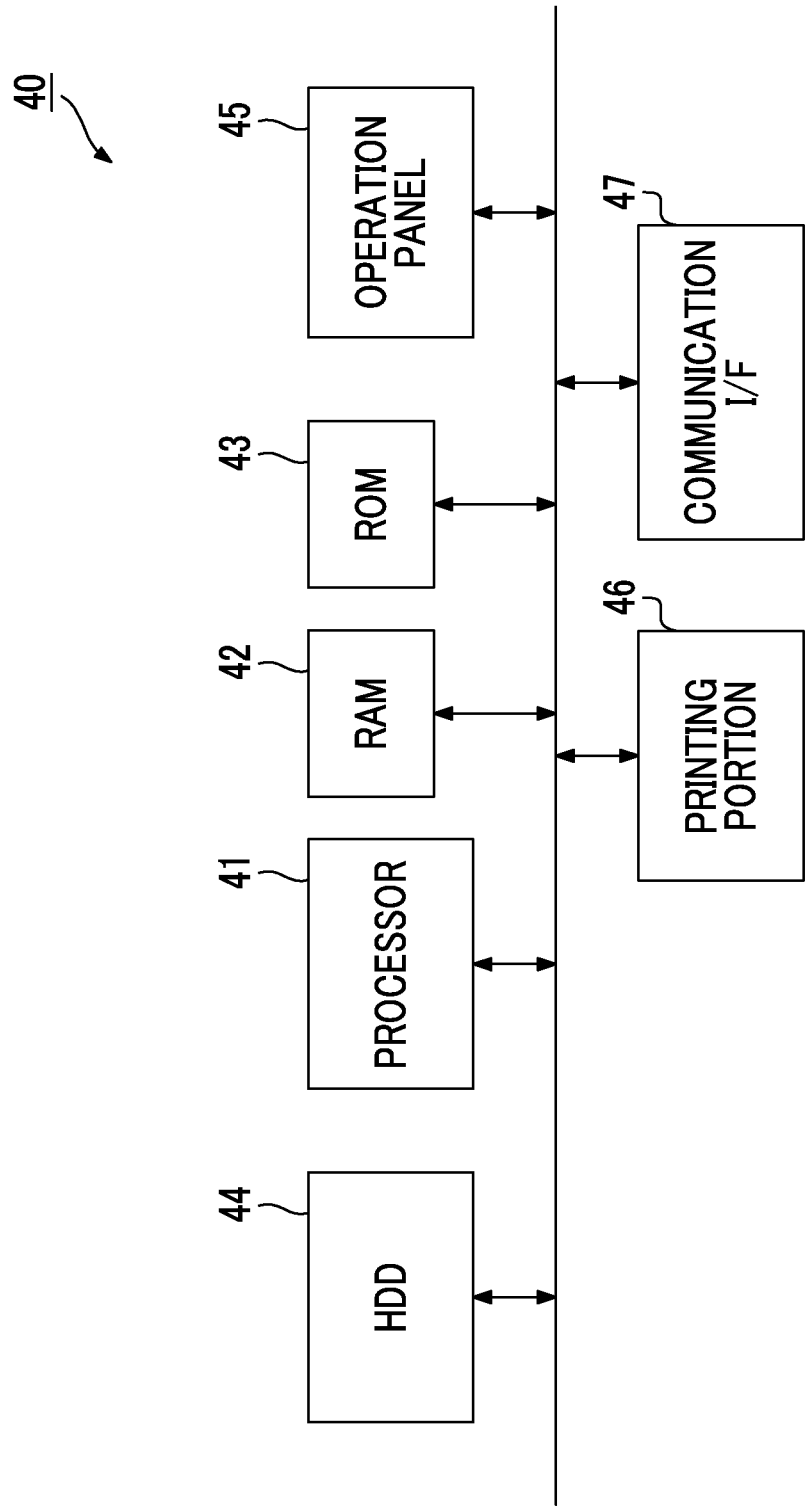
FIG. 4 is a diagram illustrating a hardware configuration example of a printing apparatus in the exemplary embodiment of the present invention.

FIG. 4 is a diagram illustrating a hardware configuration example of the printing apparatus 40 in the present exemplary embodiment. As illustrated, the printing apparatus 40 includes a processor 41, a RAM 42, a ROM 43, an HDD 44, an operation panel 45, a printing portion 46, and a communication I/F 47.

The processor 41 implements a process for printing in the printing portion 46 by loading various programs stored in the ROM 43 or the like into the RAM 42 and executing the various programs.

The RAM 42 is a memory used as a work memory or the like of the processor 41. The ROM 43 is a memory storing the various programs or the like executed by the processor 41. The HDD 44 is, for example, a magnetic disk apparatus storing printing data or the like used in printing in the printing portion 46.

The operation panel 45 is, for example, a touch panel that displays various information and receives an operation input from the user. Here, the operation panel 45 consists of a display on which various information are displayed, and a position detection sheet that detects a position of an instruction issued by instruction means such as a finger or a stylus pen. Alternatively, a display and a keyboard may be used instead of the touch panel.

The printing portion 46 prints the image on the recording medium such as paper. Here, the printing portion 46 is, for example, a printer. An electrophotographic type that forms the image by transferring toner attached to a photoconductor to the recording medium, or an ink jet type that forms the image by ejecting ink to the recording medium may be used.

The communication I/F 47 transmits and receives various information to and from the server 20 via the communication line 80.

Schematic Operation of Present Exemplary Embodiment

Figure 5:
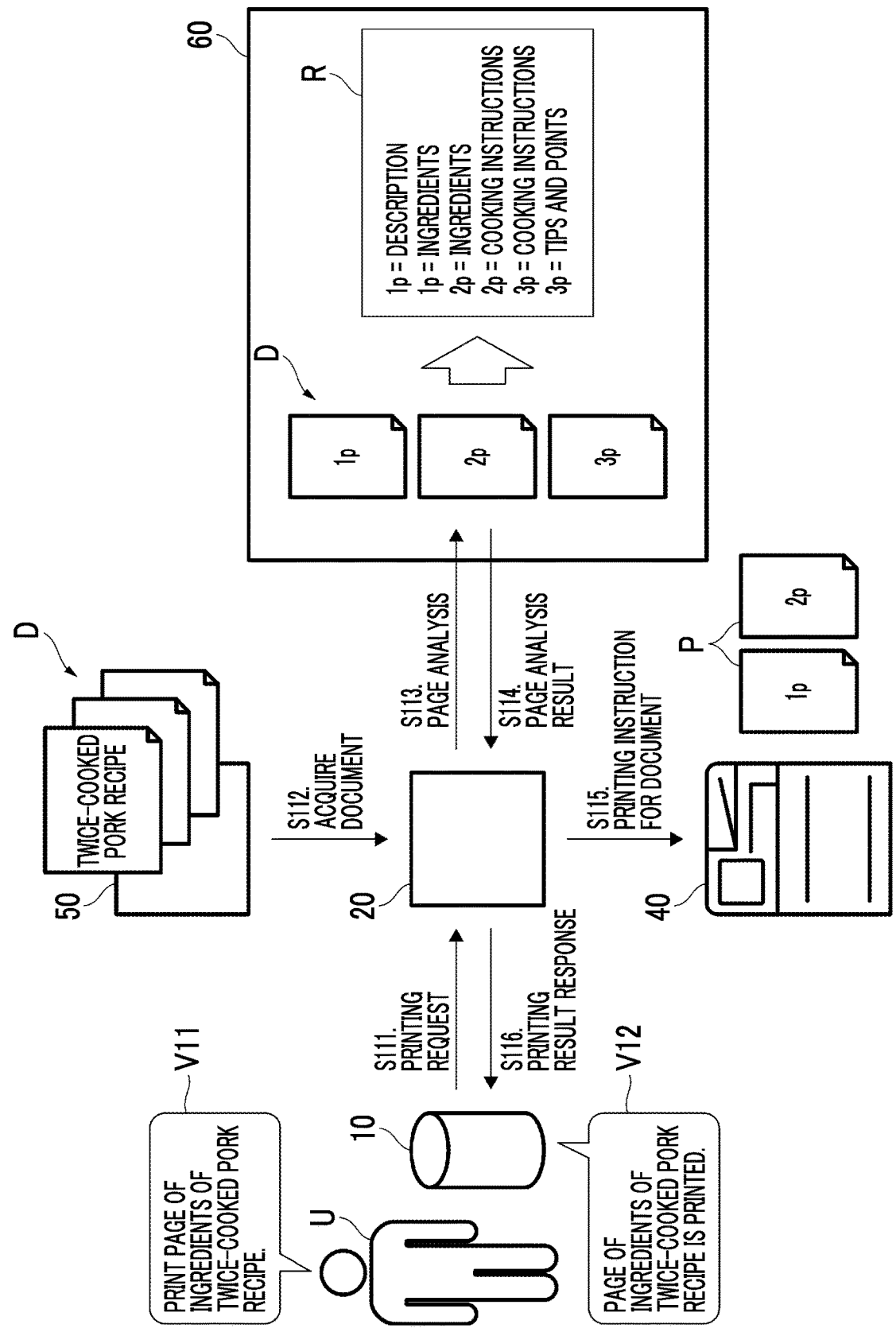
FIG. 5 is a diagram for describing a first schematic operation of the printing system in the exemplary embodiment of the present invention.
Figure 6:
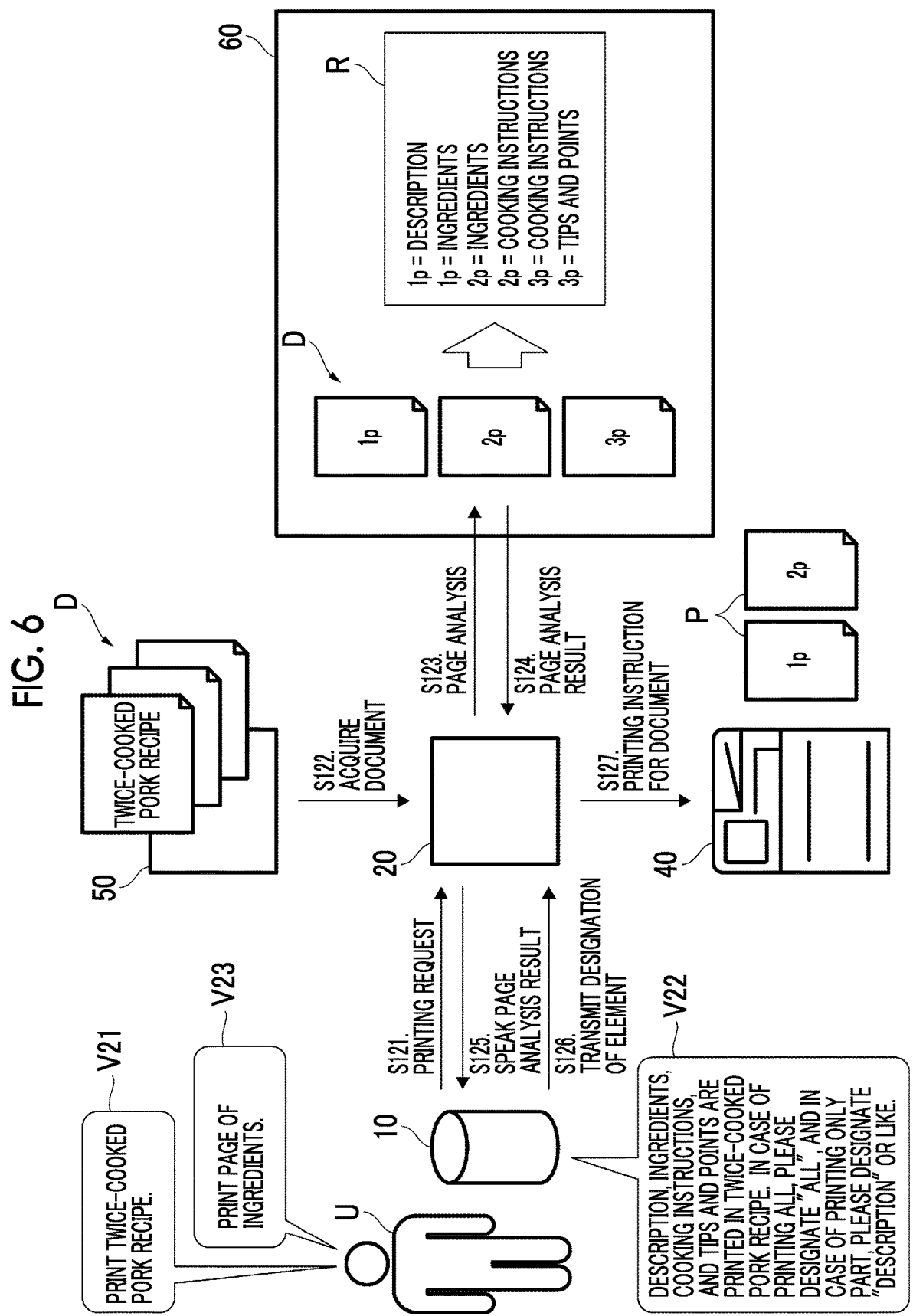
FIG. 6 is a diagram for describing a second schematic operation of the printing system in the exemplary embodiment of the present invention.
Figure 7:
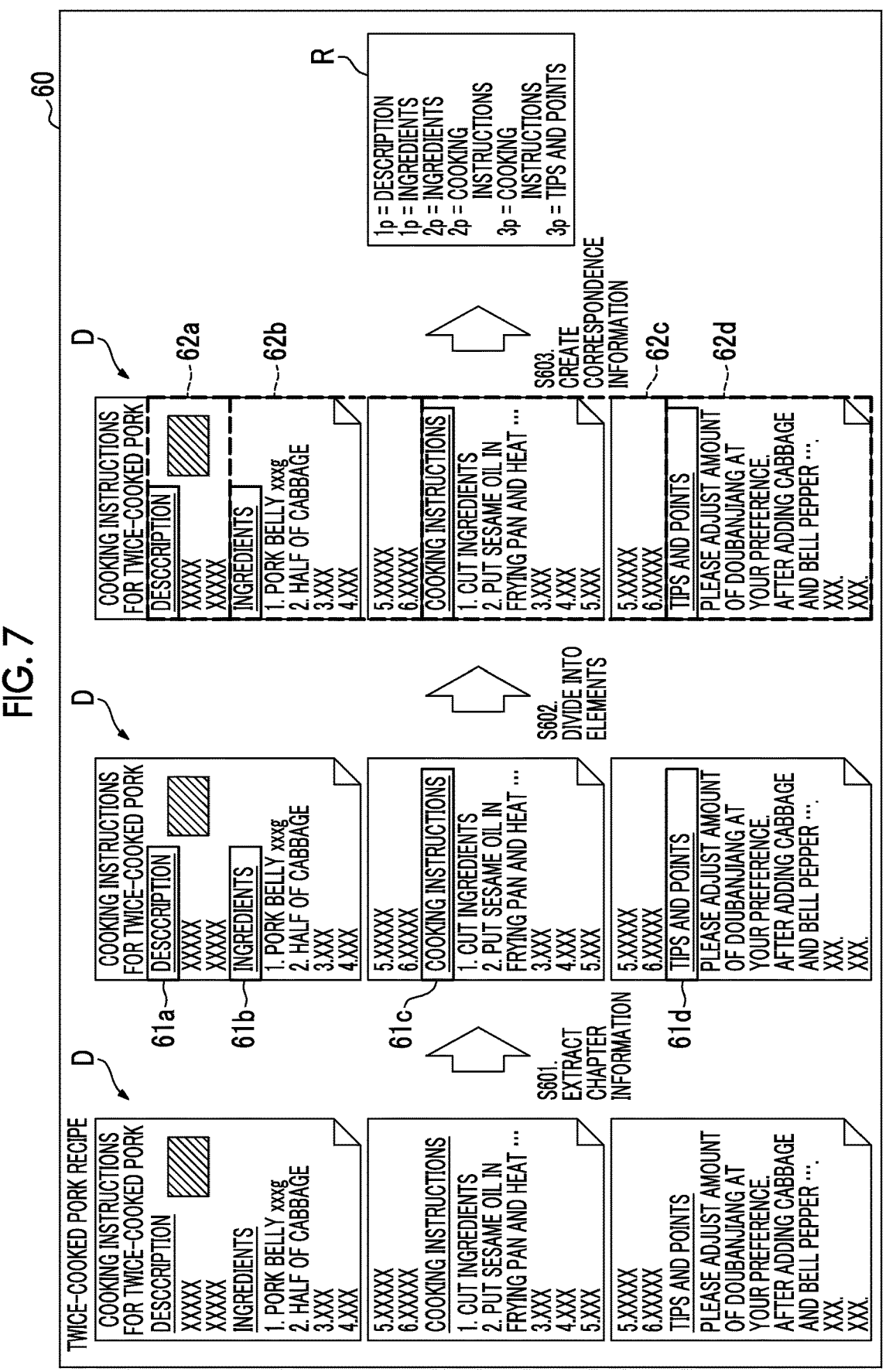
FIG. 7 is a diagram for describing a schematic operation of a page analysis apparatus in the exemplary embodiment of the present invention.

FIG. 5 to FIG. 7 are diagrams for describing a schematic operation of the present exemplary embodiment. In these drawings, any of a document storage apparatus 50 not illustrated in FIG. 1 and a page analysis apparatus 60 not illustrated in FIG. 1 assuming that the page analysis apparatus 60 is included in the server 20 may be illustrated. In addition, in a case where making a query to the smart speaker 10, the user generally makes a call for starting using the voice assistant function of the smart speaker 10. However, this call is not illustrated in the drawings.

FIG. 5 illustrates a first schematic operation of the printing system 1. The first schematic operation is an operation in a case where which element is included in the document to be printed is known in advance. That is, in the first schematic operation, in making the printing request for the document by voice, in a case where the user speaks including an element of the document to be printed, the element is selected and printed.

In the drawing, first, in a case where a user U speaks a voice V11 of "Print page of ingredients of twice-cooked pork recipe.", the smart speaker 10 transmits the printing request to the server 20 (step S111). Then, the server 20 acquires a document D of the twice-cooked pork recipe from the document storage apparatus 50 (step S112) and requests the page analysis apparatus 60 to perform page analysis on the document D (step S113). Accordingly, in a case where the page analysis apparatus 60 creates a page analysis result R from the document D, the server 20 acquires the page analysis result R (step S114) and transmits the printing instruction for the document D to the printing apparatus 40 based on the page analysis result R (step S115). In this example, the page analysis result R indicates that the ingredients are described on a first page and a second page. Thus, in the printing apparatus 40, the first page and the second page of the document D are printed as a printed matter P in accordance with the printing instruction. Then, the server 20 transmits a printing result response to the smart speaker 10 (step S116), and the smart speaker 10 outputs a voice V12 of "Page of ingredients of twice-cooked pork recipe is printed.".

FIG. 6 illustrates a second schematic operation of the printing system 1. The second schematic operation is an operation in a case where which element is included in the document to be printed is not known in advance. That is, in the second schematic operation, in a case where the user makes the printing request for the document by voice, the smart speaker 10 notifies the user of which element is included in the document. Accordingly, in a case where the user speaks the element of the document to be printed, the element is selected and printed.

In the drawing, first, in a case where the user U speaks a voice V21 of "Print twice-cooked pork recipe.", the smart speaker 10 transmits the printing request to the server 20 (step S121). Then, the server 20 acquires the document D of the twice-cooked pork recipe from the document storage apparatus 50 (step S122) and requests the page analysis apparatus 60 to perform the page analysis on the document D (step S123). Accordingly, in a case where the page analysis apparatus 60 creates the page analysis result R from the document D, the server 20 acquires the page analysis result R (step S124) and instructs the smart speaker 10 to speak based on the page analysis result R (step S125). Accordingly, the smart speaker 10 outputs a voice V22 of "Description, ingredients, cooking instructions, and tips and points are printed in twice-cooked pork recipe. In case of printing all, please designate "all", and in case of printing only part, please designate "description" or like.". In a case where the user U speaks a voice V23 of "Print page of ingredients." in response, the smart speaker 10 transmits a designation of the element to be printed to the server 20 (step S126). The server 20 transmits the printing instruction for the document D to the printing apparatus 40 based on the designation of the element (step S127). In this example, the page analysis result R indicates that the ingredients are described on a first page and a second page. Thus, in the printing apparatus 40, the first page and the second page of the document D are printed as a printed matter P in accordance with the printing instruction.

While a case where which element is included in the document to be printed is not known in advance is assumed above, a case where which element is included in the document to be printed is known, and where the element to be printed is in the document is not known in advance is also considered. An operation in this case is the second schematic operation to which the following changes are made. That is, in a case where the instruction to speak based on the page analysis result R is received from the server 20 in step S125, the smart speaker 10 outputs a voice of "In twice-cooked pork recipe, description is described on first page, ingredients are described on first and second pages, cooking instructions are described on second and third pages, and tips and points are described on third page. Which page is to be printed?" or the like. In addition, in a case where the user U speaks a voice of "Print second and third pages." or the like in response, the smart speaker 10 transmits a designation of the page to be printed to the server 20 in step S126.

FIG. 7 illustrates a schematic operation of the page analysis apparatus 60. Here, a method of analysis based on information (hereinafter, referred to as "chapter information") related to chapters in the document is illustrated. Particularly, an example of using the chapter information in the highest layer is illustrated.

In the drawing, first, the page analysis apparatus 60 extracts the chapter information from the document D (step S601). In this example, chapter information 61a to 61d are extracted as a result of the process in step S601. In a case where the document D is a hypertext markup language (HTML) document, the page analysis apparatus 60 may extract the chapter information from the document D using tag information. In addition, in a case where the document D is a portable document format (PDF) document, the page analysis apparatus 60 may extract the chapter information from the document D using bookmark information. Next, the page analysis apparatus 60 divides the document D into elements using the chapter information (step S602). In this example, the first page is divided into an element 62a of the description and an element 62b of the ingredients. The second page is divided into the element 62b of the ingredients and an element 62c of the cooking instructions. The third page is divided into the element 62c of the cooking instructions and an element 62d of tips and points. Then, based on this division result, the page analysis apparatus 60 creates, as the page analysis result R, correspondence information in which information about the pages is associated with information about the elements (step S603).

While the page analysis apparatus 60 analyzes the pages using the chapter information in the highest layer above, the present invention is not limited thereto.

In a case where the document D has the chapter information in a layered structure consisting of a plurality of layers, the page analysis apparatus 60 may analyze the pages using the chapter information in a layer other than the highest layer, such as a second layer from the top or a third layer from the top. In this case, the chapter information may be a chapter, a section, a paragraph, or the like.

The page analysis apparatus 60 may use the chapter information in a predetermined layer. Alternatively, the page analysis apparatus 60 may decide which layer of the chapter information is to be used, based on the number of pages including elements corresponding to the chapter information in each layer. For example, in the example in FIG. 7, each element is assumed to fall within two pages. For example, an assumption that elements corresponding to chapter "tips and points" exceed two pages, and elements corresponding to sections "tips and points on stir-frying", "tips and points on plating", and the like fall within two pages is made. For example, in this case, the page analysis apparatus 60 may use information about the section in the second layer from the top as the chapter information.

In addition, while the page analysis apparatus 60 represents the elements using the chapter information, the present invention is not limited thereto. Representing the elements using the chapter information makes it difficult to understand meaning contents of the elements. Thus, the page analysis apparatus 60 may create summaries of the contents of the elements and represent the elements using the summaries instead of representing the elements using the chapter information or in addition to representing the elements using the chapter information. For example, in this case, the page analysis apparatus 60 may create the summaries of the contents of the elements by implementing an algorithm such as LexRank, TextRank, and LSA or using a summarization API of an external cloud.

Functional Configuration of Server

Figure 8:
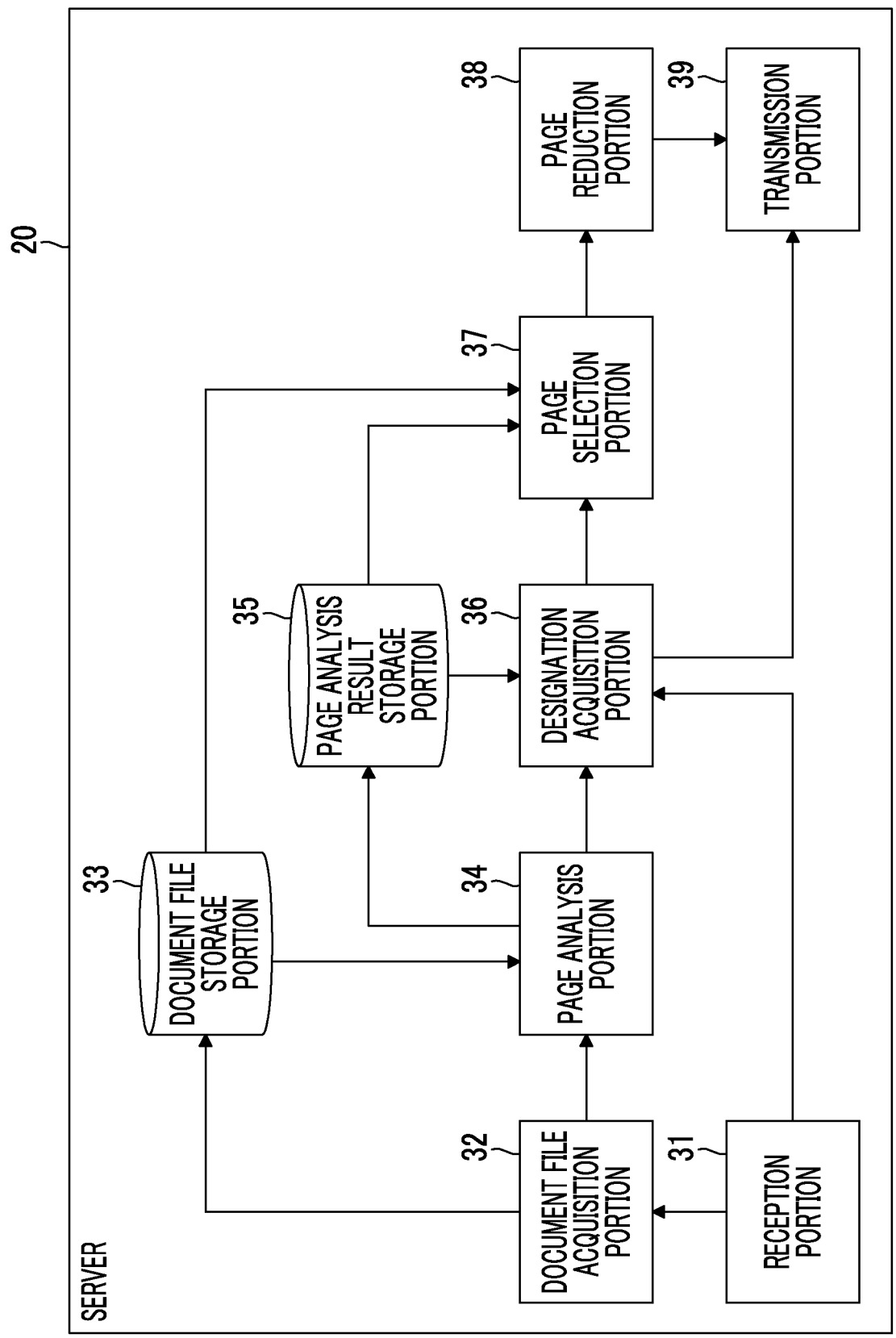
FIG. 8 is a block diagram illustrating a functional configuration example of the server in the exemplary embodiment of the present invention.

FIG. 8 is a block diagram illustrating a functional configuration example of the server 20 in the present exemplary embodiment. As illustrated, the server 20 includes a reception portion 31, a document file acquisition portion 32, a document file storage portion 33, a page analysis portion 34, a page analysis result storage portion 35, a designation acquisition portion 36, a page selection portion 37, a page reduction portion 38, and a transmission portion 39.

The reception portion 31 receives the request information from the smart speaker 10. Here, in a case where the user makes the printing request by voice, the smart speaker 10 recognizes the voice of the printing request, generates the request information as information for requesting printing based on the result of recognition, and transmits the request information.

The request information may include a designation of an element of a document file. In this case, the reception portion 31 receives the request information that includes a designation of the document file of a printing target and a designation of any of a plurality of elements constituting the document file. In the present exemplary embodiment, the request information is used as an example of the printing request for the document that is based on the spoken voice of the user and includes the designation of the specific element among the plurality of elements constituting the document. This process of the reception portion 31 is performed as an example of reception of the printing request.

The request information may not include the designation of the element of the document file. In this case, the reception portion 31 receives the request information that includes the designation of the document file of the printing target and does not include the designation of any of the plurality of elements constituting the document file. In the present exemplary embodiment, the request information is used as an example of the designation of the document based on the spoken voice of the user. This process of the reception portion 31 is performed as an example of reception of the designation. In addition, in the present exemplary embodiment, the request information is used as an example of the printing request for the document based on the spoken voice of the user. This process of the reception portion 31 is performed as an example of reception of the printing request.

In addition, the reception portion 31 receives designation information from the smart speaker 10. Here, in a case where the user designates information related to printing by voice, the smart speaker 10 recognizes the voice of the designation, generates the designation information as information for designating the element based on the result of recognition, and transmits the designation information.

The element of the document file may be designated in the designation information. In this case, the reception portion 31 receives the designation information including the designation of the element of the document file. In the present exemplary embodiment, the designation information is used as an example of the printing request that is received after the designation of the document based on the spoken voice of the user and includes the designation of the specific element. This process of the reception portion 31 is performed as an example of reception of the printing request.

A page of the document file may be designated in the designation information. In this case, the reception portion 31 receives the designation information including the designation of the page of the document file. In the present exemplary embodiment, the designation information is used as an example of a designation of a specific part among a plurality of parts based on the spoken voice of the user. This process of the reception portion 31 is performed as an example of reception of the designation.

The document file acquisition portion 32 receives the request information received by the reception portion 31 and acquires the document file of the printing target included in the request information. For example, the document file acquisition portion 32 may acquire the document file from the document storage apparatus 50 illustrated in FIG. 5 and FIG. 6.

The document file storage portion 33 stores the document file acquired by the document file acquisition portion 32.

The page analysis portion 34 analyzes pages of the document file stored in the document file storage portion 33 and generates the page analysis result that is the correspondence information in which the information about the pages is associated with the information about the elements. For example, the page analysis portion 34 implements a function of the page analysis apparatus 60 illustrated in FIG. 7 in the server 20. Accordingly, for example, as illustrated in FIG. 7, the information about the elements may be acquired based on the chapter information in the pages. Alternatively, the information about the elements may be generated by summarizing contents of the chapters in the pages. In the present exemplary embodiment, this process of the page analysis portion 34 is performed as an example of generating the content of each element by summarizing each element.

The page analysis result storage portion 35 stores the page analysis result generated by the page analysis portion 34.

The designation acquisition portion 36 receives the request information received by the reception portion 31 and determines whether or not the designation of the element is included in the request information.

In a case where the designation of the element is included in the request information, the designation acquisition portion 36 acquires the designation of the element from the request information and outputs the designation of the element to the page selection portion 37.

In a case where the designation of the element is not included in the request information, the designation acquisition portion 36 outputs a response instruction based on the page analysis result stored in the page analysis result storage portion 35 to the transmission portion 39.

For example, the designation acquisition portion 36 may output information indicating the contents of the elements to the transmission portion 39 as the response instruction. In the present exemplary embodiment, this process of the designation acquisition portion 36 is performed as an example of performing the control for outputting the response voice indicating the content of each element of the plurality of elements. In addition, the designation acquisition portion 36 may output information related to the pages corresponding to the elements to the transmission portion 39 as the response instruction. In the present exemplary embodiment, this process of the designation acquisition portion 36 is performed as an example of performing the control for outputting the response voice indicating information related to the part including each element of the document. Here, for example, the information related to the pages corresponding to the elements may be the number of pages for each element. In this case, the number of pages for each element is an example of information about a size of the part including each element of the document. In addition, the designation acquisition portion 36 may output information indicating a content of an element in a certain layer in the layered structure to the transmission portion 39 as the response instruction. In the present exemplary embodiment, this process of the designation acquisition portion 36 is performed as an example of performing the control for outputting the response voice indicating the content of each element of the plurality of elements corresponding to a specific layer in the layered structure. The designation acquisition portion 36 may decide the layer in the layered structure based on the number of pages including the element in the layer. In the present exemplary embodiment, this process of the designation acquisition portion 36 is performed as an example of deciding the specific layer based on the size of the part including each element of the document.

Alternatively, the designation acquisition portion 36 may output the page analysis result to the transmission portion 39 as the response instruction. In the present exemplary embodiment, this process of the designation acquisition portion 36 is performed as an example of performing the control for outputting the response voice indicating the part including each element of the plurality of elements constituting the document among the plurality of parts of the document.

In addition, the designation acquisition portion 36 receives the designation information received by the reception portion 31, acquires the designation of the element or the page from the designation information, and outputs the designation of the element or the page to the page selection portion 37.

The page selection portion 37 receives the designation of the element acquired from the request information by the designation acquisition portion 36, or the designation of the element or the page acquired from the designation information by the designation acquisition portion 36.

In a case where the designation of the element is received from the designation acquisition portion 36, the page selection portion 37 selects a page including the element of the document file stored in the document file storage portion 33 by referring to the page analysis result stored in the page analysis result storage portion 35. In the present exemplary embodiment, this process of the page selection portion 37 is performed as an example of performing the control for printing the part including the specific element of the document.

In a case where the designation of the page is received from the designation acquisition portion 36, the page selection portion 37 selects the page of the document file stored in the document file storage portion 33. In the present exemplary embodiment, this process of the page selection portion 37 is performed as an example of performing the control for printing the specific part of the document.

The page reduction portion 38 reduces pages of the document file selected by the page selection portion 37. For example, the page reduction portion 38 reduces the pages by rearranging only the pages selected by the page selection portion 37 on a new page. For example, in the example in FIG. 7, while the ingredients are present across the first page and the second page, the ingredients fall within one page in a case where the ingredients are rearranged on a new page. Thus, the pages are reduced. In the present exemplary embodiment, this process of the page reduction portion 38 is performed as an example of, in a case where performing the control for printing the page including the specific element of the document, performing a control for printing a new page on which the specific element is rearranged.

In addition, after the pages selected by the page selection portion 37 are rearranged on the new page, in a case where a blank is present on the new page, the page reduction portion 38 may add another content that falls within the blank. In the present exemplary embodiment, this process of the page reduction portion 38 is performed as an example of, in a case where the new page includes a blank, arranging an element other than the specific element in the blank.

Furthermore, in a case where the number of pages is reduced by shrinking elements on the pages selected by the page selection portion 37, the page reduction portion 38 shrinks the elements. For example, the page reduction portion 38 may check a ratio of a blank of the last page in a case of printing without shrinking the elements, and shrink the elements in a case where the ratio of the blank is greater than or equal to a reference. In addition, a case of printing the pages without shrinking the elements may be compared with a case of printing the pages by shrinking the elements at a predetermined shrinkage ratio. In a case where the number of pages is less in the latter case than in the former case, the elements may be shrunk at the shrinkage ratio. Alternatively, the page reduction portion 38 may compare cases of printing by shrinking the elements at a plurality of shrinkage ratios, select a shrinkage ratio that has an effect of page reduction and is closest to 100%, and shrink the elements at the shrinkage ratio. In addition, the page reduction portion 38 may reduce the number of pages by deleting an element that is not related to the element to be printed and is displayed at all times, and shrinking the remaining elements. Furthermore, the page reduction portion 38 may specify, by text recognition, an element for which an instruction to not shrink is issued, and not shrink the element. In this case, the element for which the instruction to not shrink is issued is an example of a part of the specific element that is designated to be not shrunk. In the present exemplary embodiment, this process of the page reduction portion 38 is performed as an example of performing a control for printing a new page on which the specific element is rearranged by shrinking at least a part of the specific element.

The transmission portion 39 transmits the printing instruction for the pages selected by the page selection portion 37 to the printing apparatus 40. Here, in a case where the page reduction portion 38 reduces the pages, the pages of a target of the printing instruction may be the pages after page reduction.

In addition, in a case where the response instruction based on the page analysis result is received from the designation acquisition portion 36, the transmission portion 39 transmits the response instruction to the smart speaker 10.

While not mentioned above, the server 20 may store the page analysis result of the document file in the page analysis result storage portion 35 by associating the page analysis result with identification information about the document file. In a case where the printing request for the same document file is received, the server 20 may print the document file using the page analysis result stored in the page analysis result storage portion 35.

Operation of Server 20

Figure 9:
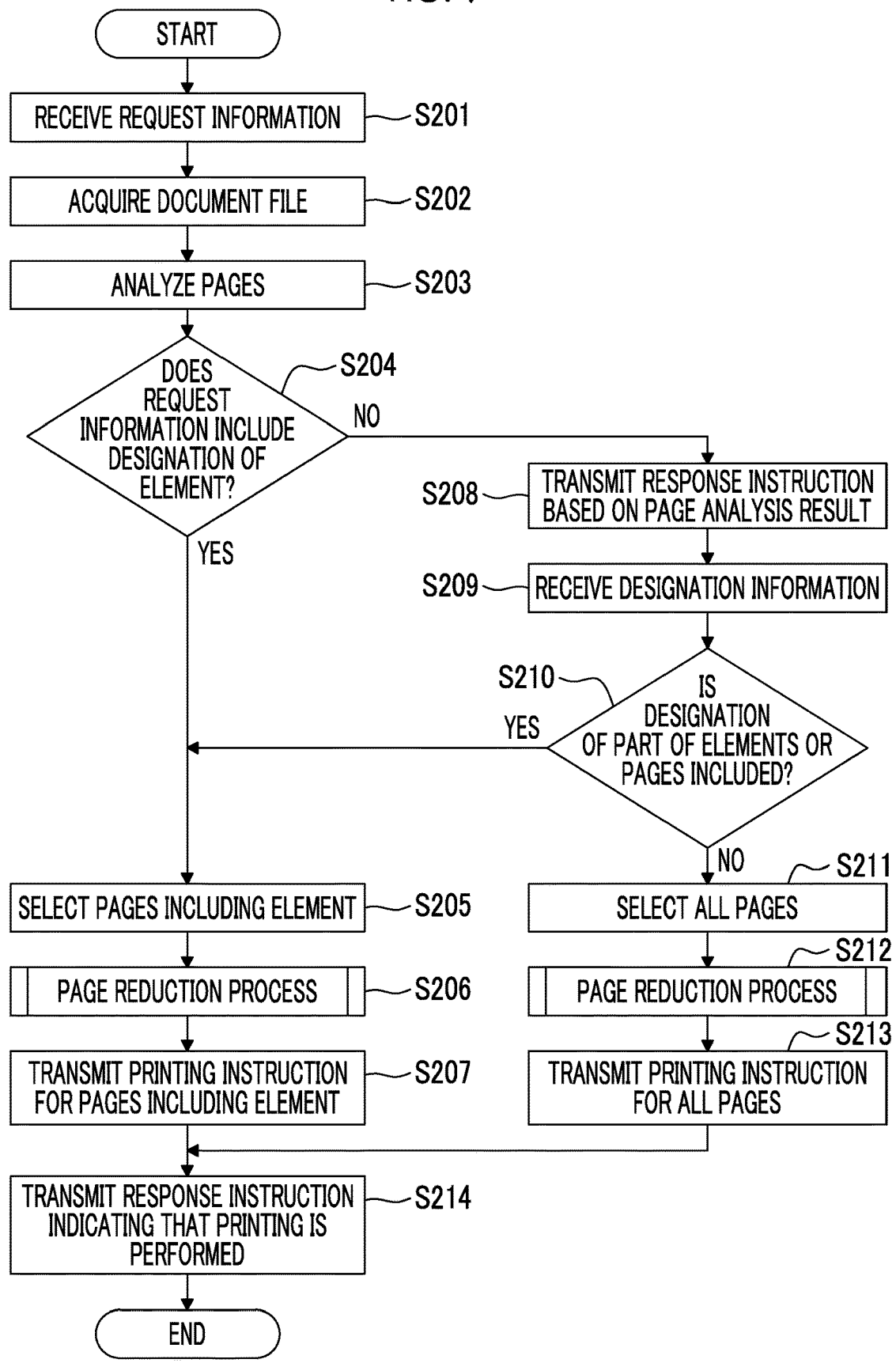
FIG. 9 is a flowchart illustrating an operation example of the server in the exemplary embodiment of the present invention.

FIG. 9 is a flowchart illustrating an operation example of the server 20 in the present exemplary embodiment.

As illustrated, in the server 20, first, the reception portion 31 receives the request information from the smart speaker 10 (step S201).

Next, the document file acquisition portion 32 acquires the document file specified by the request information received in step S201 (step S202). The document file is stored in the document file storage portion 33.

Next, the page analysis portion 34 analyzes the pages of the document file acquired in step S202 (step S203). The document file is read out from the document file storage portion 33. In addition, the page analysis result here is stored in the page analysis result storage portion 35.

Next, the designation acquisition portion 36 determines whether or not the request information received in step S201 includes the designation of the element (step S204).

First, a case where a determination that the request information includes the designation of the element is made in step S204 will be described. In this case, the page selection portion 37 selects pages including the designated element of the document file (step S205). The page selection portion 37 may specify the pages including the designated element by referring to the page analysis result stored in the page analysis result storage portion 35.

Next, the page reduction portion 38 performs a page reduction process on the pages selected in step S205 (step S206). Details of the page reduction process will be described later.

Next, the transmission portion 39 transmits the printing instruction for the pages including the designated element of the document file to the printing apparatus 40 (step S207). Here, the pages including the designated element are the pages selected in step S205. In addition, the pages including the designated element may be the pages on which the page reduction process is performed in step S206. By transmitting the printing instruction, the pages including the designated element of the document file are printed in the printing apparatus 40.

In addition, a case where a determination that the request information does not include the designation of the element is made in step S204 will be described. In this case, the transmission portion 39 transmits the response instruction based on the page analysis result to the smart speaker 10 (step S208). Here, the response instruction based on the page analysis result may be information about the number of pages for each element or may be the correspondence information in which the information about the pages is associated with the information about the elements. These information may be generated by the designation acquisition portion 36 based on the page analysis result stored in the page analysis result storage portion 35. By transmitting the response instruction, a response indicating the information about the number of pages for each element or a response indicating the correspondence information in which the information about the pages is associated with the information about the elements is spoken in the smart speaker 10.

In a case where the user speaks an element or a page in response, the smart speaker 10 transmits the designation information for designating the element or the page to the server 20. Accordingly, in the server 20, the reception portion 31 receives the designation information (step S209).

In the designation information received in step S209, the designation information for designating the element may be designation information for designating a part of the elements or designation information for designating all elements. In addition, in the designation information received in step S209, the designation information for designating the page may be designation information for designating a part of the pages or designation information for designating all pages. Therefore, the designation acquisition portion 36 determines whether or not the designation information received in step S209 includes a designation of the part of the elements or the pages (step S210).

First, a case where a determination that the designation information includes the designation of the part of the elements or the pages is made in step S210 will be described. In this case, the page selection portion 37, the page reduction portion 38, and the transmission portion 39 perform the processes of step S205, step S206, and step S207.

In addition, a case where a determination that the designation information does not include the designation of the part of the elements or the pages is made in step S210 will be described. In this case, the page selection portion 37 selects all pages of the document file (step S211).

Next, the page reduction portion 38 performs the page reduction process on the pages selected in step S211 (step S212). Details of the page reduction process will be described later.

Next, the transmission portion 39 transmits the printing instruction for all pages of the document file to the printing apparatus 40 (step S213). Here, all pages are the pages selected in step S211. In addition, all pages may be the pages on which the page reduction process is performed in step S212. By transmitting the printing instruction, all pages of the document file are printed in the printing apparatus 40.

Then, the transmission portion 39 transmits, to the smart speaker 10, the response instruction for issuing an instruction for a response indicating that intended pages of the document file are printed (step S214). By transmitting the response instruction, the response indicating that the intended pages of the document file are printed is spoken in the smart speaker 10.

Figure 10:
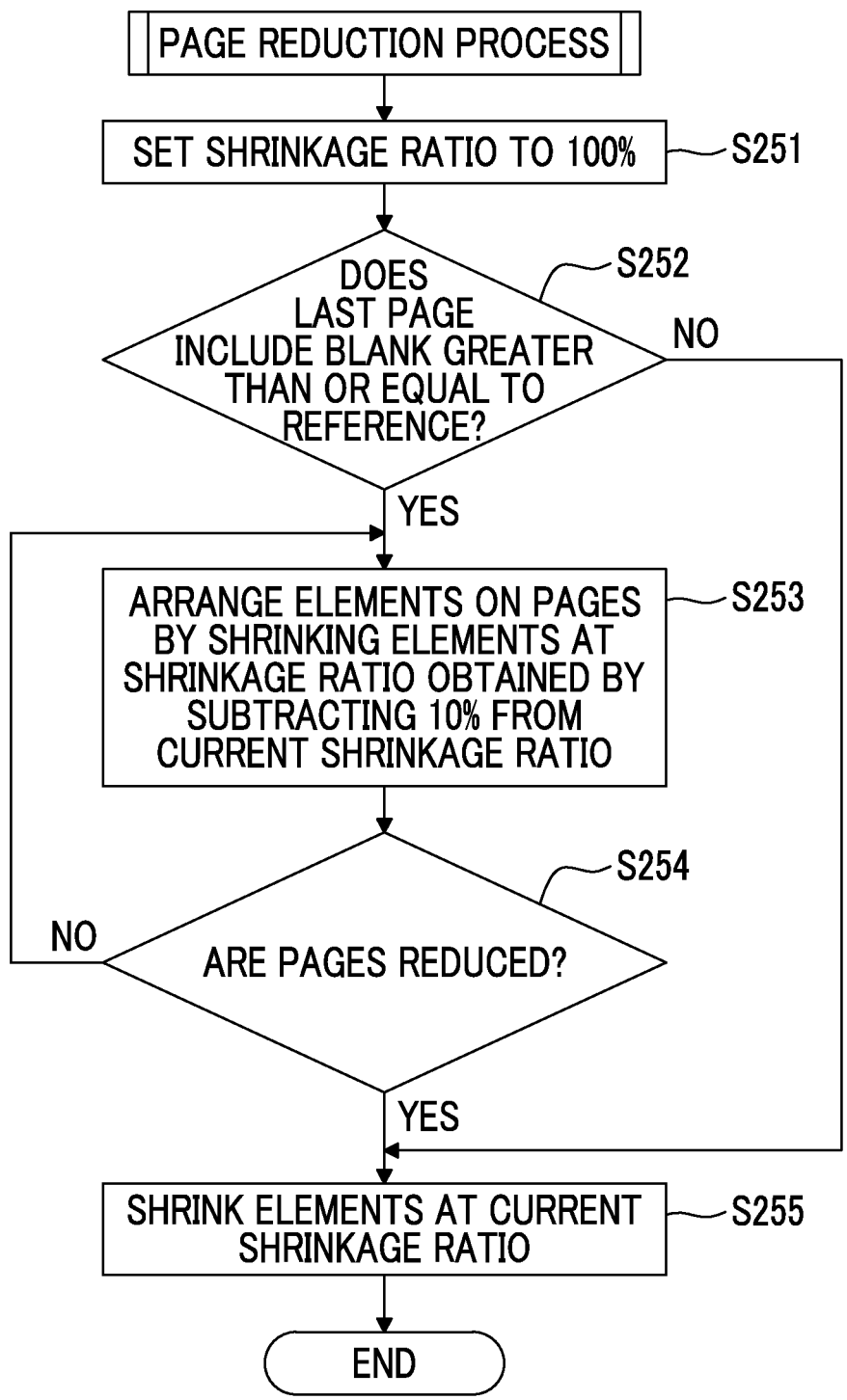
FIG. 10 is a flowchart illustrating a flow of page reduction process.

FIG. 10 is a flowchart illustrating a flow of page reduction process of step S206 or step S212 in FIG. 9. While various page reduction processes are considered, a process of reduction by shrinking the elements included in the pages will be illustrated here.

As illustrated, first, the page reduction portion 38 sets the shrinkage ratio to 100% (step S251).

Next, the page reduction portion 38 determines whether or not the last page includes a blank greater than or equal to the reference (step S252). Here, as the last page, the page reduction portion 38 may use the last page in a case of printing at 100%. In addition, for example, the blank greater than or equal to the reference may be a blank corresponding to the number of lines greater than or equal to a predetermined threshold value on the page. The predetermined threshold value may be any value. For example, the predetermined threshold value may be the number of lines corresponding to $2/3$ of the maximum number of lines included in the page.

In a case where a determination that the last page includes the blank greater than or equal to the reference is made in step S252, the page reduction portion 38 arranges the elements on the pages by shrinking the elements at a shrinkage ratio obtained by subtracting 10% from the current shrinkage ratio (step S253).

Next, the page reduction portion 38 determines whether or not the pages are consequently reduced (step S254).

In a case where a determination that the pages are not reduced is made in step S254, the page reduction portion 38 repeats the process of step S253.

In a case where a determination that the pages are reduced is made in step S254, the page reduction portion 38 shrinks the elements at the current shrinkage ratio (step S255). Here, the elements are elements included in the pages selected in step S205 in the page reduction process of step S206, and are elements included in the pages selected in step S211 in the page reduction process of step S212.

In addition, even in a case where a determination that the last page does not include the blank greater than or equal to the reference is made in step S252, the page reduction portion 38 shrinks the elements at the current shrinkage ratio (step S255). That is, since the current shrinkage ratio is 100%, the page reduction portion 38 does not shrink the elements.

Processor

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

Program

The process performed by the server 20 in the present exemplary embodiment is prepared as, for example, programs such as application software.

That is, a first program implementing the present exemplary embodiment is perceived as a program causing a computer to implement a function of receiving a printing request for a document that is based on a spoken voice of a user and includes a designation of a specific element among a plurality of elements constituting the document, and a function of performing a control for printing a part including the specific element of the document.

In addition, a second program implementing the present exemplary embodiment is perceived as a program causing a computer to implement a function of receiving a printing request for a document based on a spoken voice of a user, a function of performing a control for outputting a response voice indicating a part including each element of a plurality of elements constituting the document among a plurality of parts of the document, a function of receiving a designation of a specific part among the plurality of parts based on the spoken voice of the user, and a function of performing a control for printing the specific part of the document.

The programs implementing the present exemplary embodiment can be not only provided by communication means but also provided by storing the programs in a recording medium such as a CD-ROM.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor configured to:
receive a printing request for a document that is based on a spoken voice of a user and the spoken voice including a designation of a specific element among a plurality of elements constituting the document; and
perform a control for printing a part including the specific element of the document.

2. The information processing apparatus according to claim 1, wherein the processor is configured to:
perform a control for outputting a response voice indicating a content of each element of the plurality of elements, and then, receive the printing request including the designation of the specific element.

3. The information processing apparatus according to claim 2, wherein the processor is configured to:
perform a control for outputting the response voice indicating information related to a part including each element of the document.

4. The information processing apparatus according to claim 3,
wherein the information related to the part including each element of the document is information about a size of the part including each element of the document.

5. The information processing apparatus according to claim 2, wherein the processor is configured to:
perform a control for outputting the response voice indicating the content of each element of the plurality of elements corresponding to a specific layer in a layered structure.

6. The information processing apparatus according to claim 5, wherein the processor is configured to:
decide the specific layer based on a size of the part including each element of the document.

7. The information processing apparatus according to claim 2, wherein the processor is configured to:
generate the content of each element by summarizing each element.

8. The information processing apparatus according to claim 1,
wherein the part of the document is a page of the document, and
the processor is configured to, in a case where performing the control for printing the page including the specific element of the document, perform a control for printing a new page on which the specific element is rearranged.

9. The information processing apparatus according to claim 8, wherein the processor is configured to:
in a case where the new page includes a blank, arrange an element other than the specific element in the blank.

10. The information processing apparatus according to claim 8, wherein the processor is configured to:

perform a control for printing the new page on which the specific element is rearranged by shrinking at least a part of the specific element.

11. The information processing apparatus according to claim 10, wherein at least the part of the specific element is a remaining part of the specific element excluding a part that is designated to be not shrunk.

12. An information processing apparatus comprising:

a processor configured to:

receive a printing request for a document based on a first spoken voice of a user;

perform a control for outputting a response voice indicating a part including each element of a plurality of elements constituting the document among a plurality of parts of the document in response to the printing request;

receive a second spoken voice of the user, which includes a designation of a specific part among the plurality of parts; and perform a control for printing the specific part of the document.

13. A non-transitory computer readable medium storing a program causing a computer to implement:

a function of receiving a printing request for a document that is based on a spoken voice of a user, wherein the spoken voice includes a designation of a specific element among a plurality of elements constituting the document; and a function of performing a control for printing a part including the specific element of the document.

14. A non-transitory computer readable medium storing a program causing a computer to implement:

a function of receiving a printing request for a document based on a first spoken voice of a user;

a function of performing a control for outputting a response voice indicating a part including each element of a plurality of elements constituting the document among a plurality of parts of the document in response to the printing request;

a function of receiving a second spoken voice of the user, which includes a designation of a specific part among the plurality of parts; and a function of performing a control for printing the specific part of the document.

15. An information processing apparatus comprising:

a processor configured to:

receive a printing request for a document that is based on a spoken voice of a user and includes a designation of a specific element among a plurality of elements constituting the document; and perform a control for printing a new page on which the specific element of the document is rearranged by shrinking at least a part of the specific element.

16. The information processing apparatus according to claim 15, wherein at least the part of the specific element is a remaining part of the specific element excluding a part that is designated to be not shrunk.

\* \* \* \* \*